United States Patent
Wang et al.

(10) Patent No.: US 7,400,777 B2
(45) Date of Patent: Jul. 15, 2008

(54) PREPROCESSING FOR INFORMATION PATTERN ANALYSIS

(75) Inventors: Jian Wang, Beijing (CN); Liyong Chen, Beijing (CN); Yingnong Dang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 583 days.

(21) Appl. No.: 11/138,959

(22) Filed: May 25, 2005

(65) Prior Publication Data
US 2006/0269134 A1   Nov. 30, 2006

(51) Int. Cl.
*G06K 9/40* (2006.01)
(52) U.S. Cl. .................. 382/254; 382/260; 382/274; 382/275; 358/3.26; 358/3.27; 358/463
(58) Field of Classification Search .............. 382/260, 382/274, 275, 300
See application file for complete search history.

(56) References Cited

U.S. PATENT DOCUMENTS

| | | | |
|---|---|---|---|
| 5,546,515 A * | 8/1996 | Mochizuki | 345/606 |
| 6,529,638 B1 * | 3/2003 | Westerman | 382/275 |
| 7,092,122 B2 * | 8/2006 | Iwaki | 358/1.9 |
| 7,190,843 B2 * | 3/2007 | Wei et al. | 382/274 |
| 7,292,370 B2 * | 11/2007 | Iwaki | 358/1.9 |

OTHER PUBLICATIONS

Nobuyuki Otsu, "A Threshold Selection Method From Gray-Level Histogram", IEEE Transactions on Systems, Man, And Cybernetics; Jan. 1979, vol. SMC-9, No. 1 , pp. 62-66.

* cited by examiner

*Primary Examiner*—Yosef Kassa
(74) *Attorney, Agent, or Firm*—Perkins Coie LLP

(57) ABSTRACT

Pre-processing techniques for processing an image to improve the distinctiveness of an information pattern captured in the image before the information pattern is analyzed in a decoding process. The brightness of an image first is normalized by dividing the image into blocks of areas, such as pixels. A brightness distribution value then is determined for each area of the image by fitting the brightness of its surrounding blocks using bilinear interpolation and extrapolation, and a normalized brightness value for each area can then be obtained by dividing the original brightness value by the brightness distribution value. Next, masks are created to distinguish the information pattern from content captured in the image. The masks may be generated based upon contrast differences between the brightness of pixels representing the information pattern, the brightness of pixels representing content, and the brightness of pixels representing the background of the writing medium.

6 Claims, 17 Drawing Sheets

PREPROCESSING FOR INFORMATION PATTERN ANALYSIS

FIELD OF THE INVENTION

The present invention relates to processing an image for subsequent visual analysis. Various aspects of the present invention are particularly applicable to preprocessing an image so that marks forming in information pattern in the image can be easily distinguished from other objects in the image in a later processing operation.

BACKGROUND OF THE INVENTION

While electronic documents stored on computers provide a number of advantages over written documents, many users continue to perform some tasks with printed versions of electronic documents. These tasks include, for example, reading and annotating the documents. With annotations, the paper version of the document assumes particular significance, because the annotations typically are written directly onto the printed document. One of the problems, however, with directly annotating a printed version of a document is the difficulty in later converting the annotations into electronic form. Ideally, electronically stored annotations should correspond with the electronic version of the document in the same way that the handwritten annotations correspond with the printed version of the document.

Storing handwritten annotations in electronic form typically requires a user to review each handwritten annotation and personally enter it into a computer. In some cases, a user may scan the annotations written on a printed document, but this technique creates a new electronic document. The user must then reconcile the original version of the electronic document with the version having the scanned annotations. Further, scanned images frequently cannot be edited. Thus, there may be no way to separate the annotations from the underlying text of the original document. This makes using the annotations difficult.

To address this problem, pens have been developed to capture annotations written onto printed documents. In addition to a marking instrument, this type of pen includes a camera. The camera captures images of the printed document as a user writes annotations with the marking instrument. In order to associate the images with the original electronic document, however, the position of the images relative to the document must be determined. Accordingly, this type of pen often is employed with specialized media having an information pattern printed on the writing surface. The information pattern represents a code that is generated such that the different sections of the pattern occurring around a location on the media will uniquely identify that location. By analyzing or "decoding" this information pattern, a computer receiving an image from the camera can thus determine what portions of the code (and thus what portion of a document printed on the paper) were captured in the image. One example of this type of information pattern is described in U.S. patent application Ser. No. 10/284,412, entitled "Active Embedded Interaction Code," filed on Oct. 31, 2002, and naming Jian Wang et al. as inventors, which application is incorporated entirely herein by reference. In addition to providing location information, various implementations of this type of information pattern can alternately or additionally be used to represent other types of information as metadata, such as a document identification number.

While the use of such patterned paper or other media allows written annotations on a paper document to be converted into electronic form and properly associated with the electronic version of the document, this technique presents its own difficulties. For example, because the camera is mounted on the pen, both the pen and the writer's hand may affect the quality of the captured images. When writing with a pen, very few users will maintain the pen in a completely vertical direction. Instead, most users will tilt the pen toward their person, toward their person and to their left, or toward their person and to their right. A few users may even tilt the pen away from their person.

The various tilting angle between pen and paper will make the illumination of captured image varies correspondingly. For example, the gray level of an image captured from a blank area will be different from one area to another. Even if the pen includes a light, such as an infrared LED, mounted near the pen tip for illumination, when the pen is tilted the distance between the writing surface and the image sensor will not be uniform, resulting in a non-uniform illumination for the image.

In addition, the printed document itself may obscure areas of the pattern printed on the writing surface of the media. That is, the content making up the document, such as text and pictures, may obscure or occlude portions of the information pattern printed on the writing surface. If the pen captures an image of one of these areas, then the computer may not be able to use distinguish the information pattern from the content. Also, the computer may not accurately recognize the code from the image. For example, if the code is binary, then the computer may erroneously recognize a portion of the pattern representing a "0" value as a "1" value, or vice versa.

BRIEF SUMMARY OF THE INVENTION

Various aspects of the invention provide pre-processing techniques for processing an image to improve the distinctiveness of an information pattern captured in the image before the information pattern is analyzed in a decoding process. According to various implementations of the invention, the brightness of an image first is normalized. In particular, an image is divided into blocks of areas, such as pixels. A brightness distribution value then is determined for each area of the image by interpolating the brightness of its surrounding blocks. A normalized brightness value for each area can then be obtained by dividing the original brightness value for the area by the brightness distribution value.

Still other examples of the invention may alternately or additionally create masks for distinguishing an information pattern captured in the image from content captured in the image. For example, some implementations of the invention will create a mask corresponding to the content printed on the writing medium, so that this content can be excluded from analysis regarding the information pattern. Still other implementations of the invention will create a mask corresponding to the information pattern printed on the writing medium, so that the pattern can be distinctly identified. With various examples of the invention, these masks may be generated based upon contrast differences between the brightness of pixels representing the information pattern, the brightness of pixels representing content, and the brightness of pixels representing the background of the writing medium.

BRIEF DESCRIPTION OF THE DRAWINGS

FIG. 3A illustrates an example of a pen/camera device that can be employed according to various embodiments of the invention, while

DETAILED DESCRIPTION OF THE INVENTION

Overview

Figure 1:
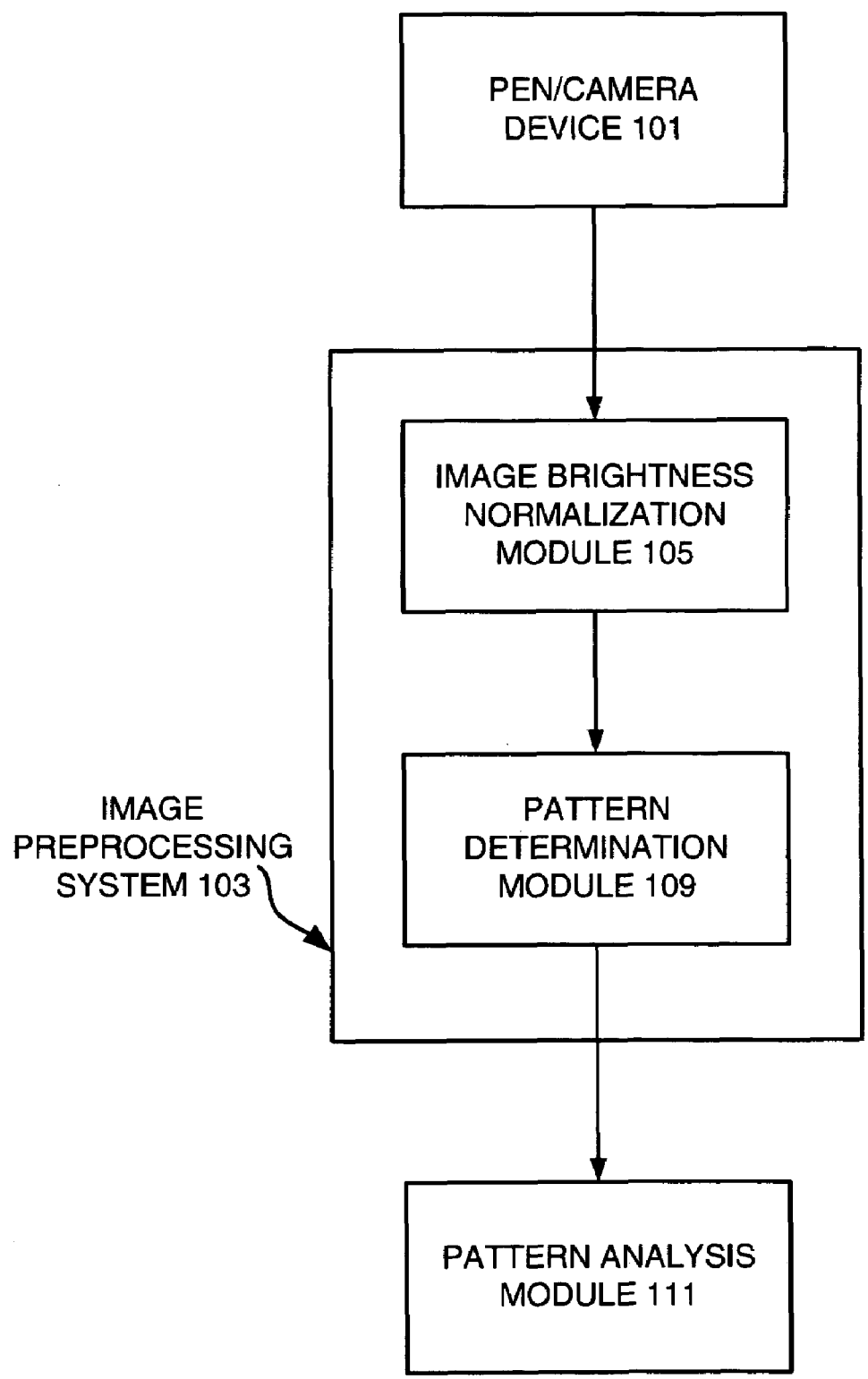
FIG. 1 shows a general description of a computer that may be used in conjunction with embodiments of the present invention.

FIG. 1 illustrates an example of a preprocessing system that may be implemented according to various examples of the invention. As seen in this figure, a pen/camera device 101 provides a captured image to the image preprocessing system 103. More particularly, the pen/camera device 101 provides a captured image to the image brightness normalization module 105. As will be explained in greater detail below, the image brightness normalization module 105 normalizes the brightness of the different areas in the image, in order to mitigate the affects of inconsistent illumination during the operation of the pen/camera device 101.

Once the brightness of the captured image has been normalized, the image brightness normalization module 105 provides the normalized image to the pattern determination module 109. As will also be described in more detail below, the pattern determination module 109 analyzes the normalized image to identify areas having differences in brightness above a threshold level, in order to distinguish those areas in the normalized image that represent content from those areas in the normalized image that represent the information pattern. In this manner, the information pattern can be more accurately distinguished from the remainder of the captured image. The preprocessed image is then provided to the pattern analysis module 111 for further processing to determine the portion of the information pattern captured in the image, and thus the location of the pen/camera device 101 when the image was obtained.

Operating Environment

Figure 2:
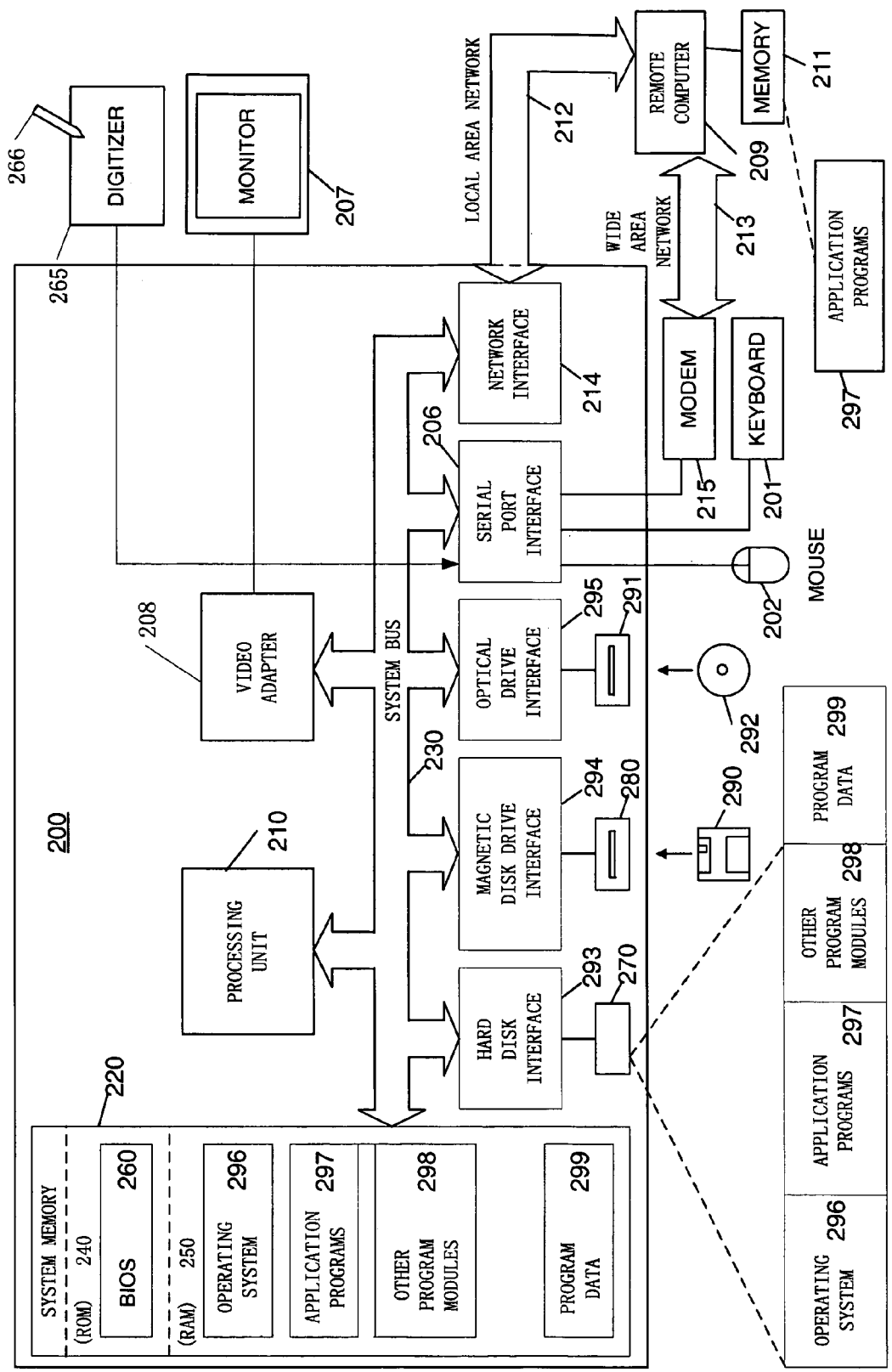
FIG. 2 illustrates an example of a computing system of the type that may be employed to implement various embodiments of the invention.

While some embodiments of the invention may be implemented using analog circuits, various embodiments of the invention will typically be implemented by executing software instructions on a programmable computer system. Accordingly, FIG. 2 shows a functional block diagram of an example of a conventional general-purpose digital computing environment that can be used to implement various aspects of the present invention. In FIG. 2, a computer 200 includes a processing unit 210, a system memory 220, and a system bus 230 that couples various system components including the system memory to the processing unit 210. The system bus 230 may be any of several types of bus structures including a memory bus or memory controller, a peripheral bus, and a local bus using any of a variety of bus architectures. The system memory 220 includes read only memory (ROM) 240 and random access memory (RAM) 250.

A basic input/output system 260 (BIOS), containing the basic routines that help to transfer information between elements within the computer 200, such as during start-up, is stored in the ROM 240. The computer 200 also includes a hard disk drive 270 for reading from and writing to a hard disk (not shown), a magnetic disk drive 280 for reading from or writing to a removable magnetic disk 290, and an optical disk drive 291 for reading from or writing to a removable optical disk 292 such as a CD ROM or other optical media. The hard disk drive 270, magnetic disk drive 280, and optical disk drive 291 are connected to the system bus 230 by a hard disk drive interface 293, a magnetic disk drive interface 294, and an optical disk drive interface 295, respectively. The drives and their associated computer-readable media provide nonvolatile storage of computer readable instructions, data structures, program modules and other data for the personal computer 200. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 270, magnetic disk 290, optical disk 292, ROM 240 or RAM 250, including an operating system 296, one or more application programs 297, other program modules 298, and program data 299. A user can enter commands and information into the computer 200 through input devices such as a keyboard 201 and pointing device 202. Other input devices (not shown) may include a microphone, joystick, game pad, satellite dish, scanner or the like. These and other input devices are often connected to the processing unit 210 through a serial port interface 206 that is coupled to the system bus, but may be connected by other interfaces, such as a parallel port, game port or a universal serial bus (USB). Further still, these devices may be coupled directly to the system bus 230 via an appropriate interface (not shown). A monitor 207 or other type of display device is also connected to the system bus 230 via an interface, such as a video adapter 208. In addition to the monitor, personal computers typically include other peripheral output devices (not shown), such as speakers and printers. In a preferred embodiment, a pen digitizer 265 and accompanying pen or stylus 266 are provided in order to digitally capture freehand input. Although a direct connection between the pen digitizer 265 and the serial port is shown, in practice, the pen digitizer 265 may be coupled to the processing unit 210 directly, via a parallel port or other interface and the system bus 230 as known in the art. Furthermore, although the digitizer 265 is shown apart from the monitor 207, it is preferred that the usable input area of the digitizer 265 be co-extensive with the display area of the monitor 207. Further still, the digitizer 265 may be integrated in the monitor 207, or may exist as a separate device overlaying or otherwise appended to the monitor 207.

The computer 200 can operate in a networked environment using logical connections to one or more remote computers, such as a remote computer 209. The remote computer 209 can be a server, a router, a network PC, a peer device or other common network node, and typically includes many or all of the elements described above relative to the computer 200, although only a memory storage device 211 has been illustrated in FIG. 2. The logical connections depicted in FIG. 2 include a local area network (LAN) 212 and a wide area network (WAN) 213. Such networking environments are commonplace in offices, enterprise-wide computer networks, intranets and the Internet.

When used in a LAN networking environment, the computer 200 is connected to the local network 212 through a network interface or adapter 214. When used in a WAN networking environment, the personal computer 200 typically includes a modem 215 or other means for establishing a communications over the wide area network 213, such as the Internet. The modem 215, which may be internal or external, is connected to the system bus 230 via the serial port interface 206. In a networked environment, program modules depicted relative to the personal computer 200, or portions thereof, may be stored in the remote memory storage device.

It will be appreciated that the network connections shown are illustrative and other techniques for establishing a communications link between the computers can be used. The existence of any of various well-known protocols such as TCP/IP, Ethernet, FTP, HTTP, Bluetooth, IEEE 802.11x and the like is presumed, and the system can be operated in a client-server configuration to permit a user to retrieve web pages from a web-based server. Any of various conventional web browsers can be used to display and manipulate data on web pages.

Image Capturing Device

As previously noted, various embodiments of the invention may be employed to determine the locations of portions of a document captured by a series of images. The determination of the location of a portion of a document captured in an image may be used to ascertain the location of a user's interaction with paper, a display screen, or other medium displaying the document. According to some implementations of the invention, the images may be obtained by an ink pen used to write ink on paper. With other embodiments of the invention, the pen may be a stylus used to "write" electronic ink on the surface of a digitizer displaying the document.

Figure 3B:
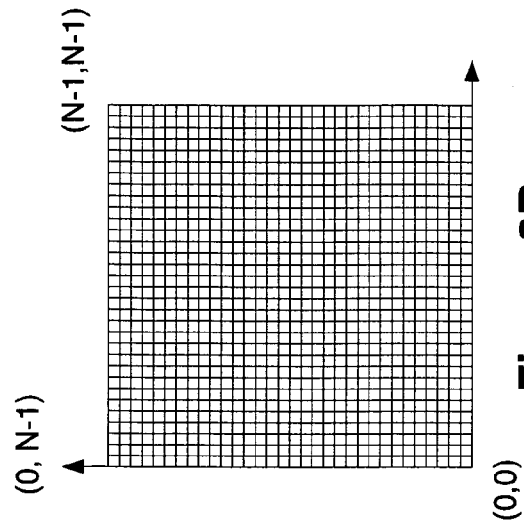
FIG. 3B illustrates the resolution of an image that may be obtained by various embodiments of the invention.
Figure 3A:
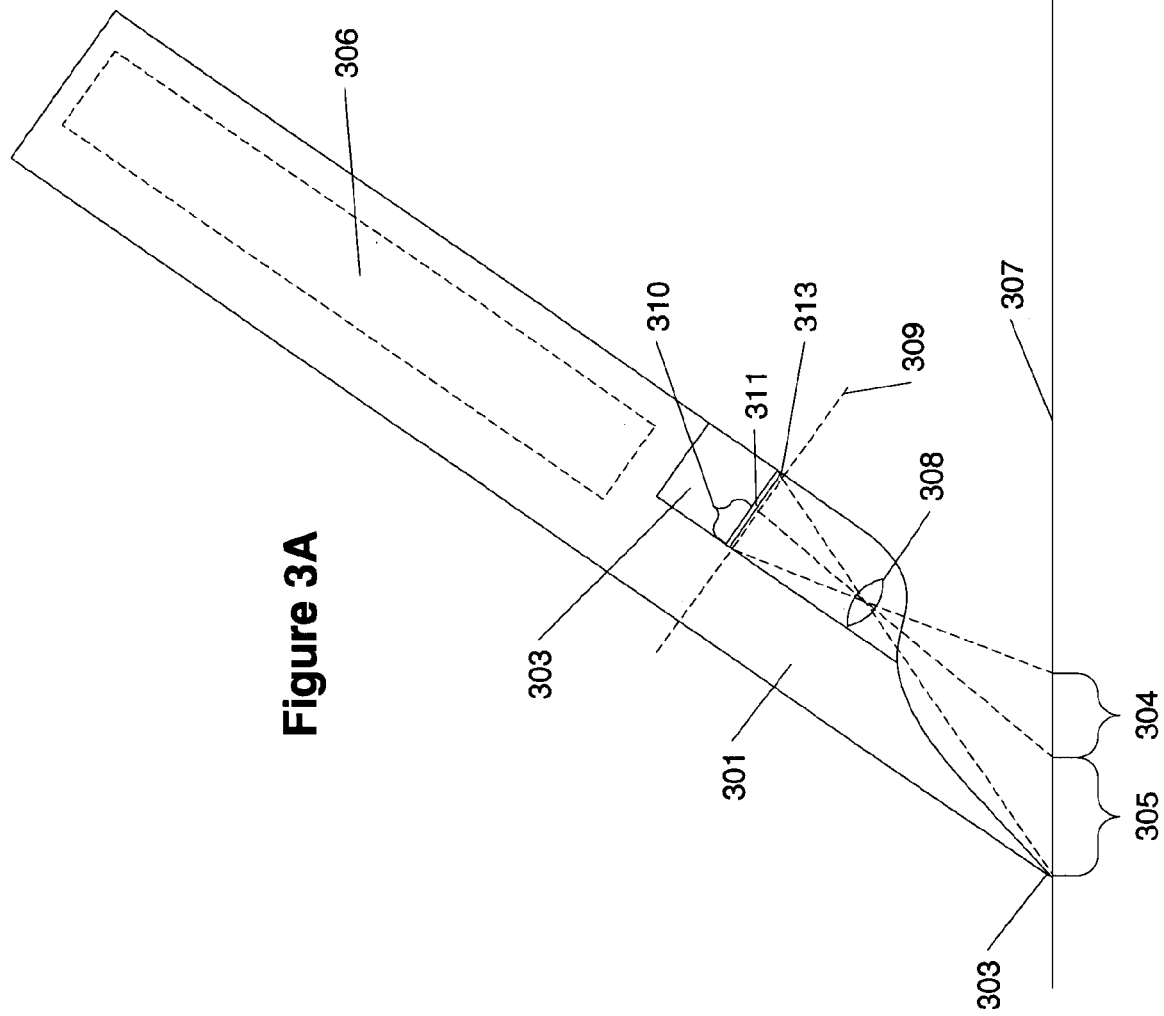

FIGS. 3A and 3B show an illustrative example of a pen 301 that may be employed as the pen/camera device 101 according to various embodiments of the invention. The pen 301 includes a tip 302 and a camera 303. The tip 302 that may or may not include an ink reservoir. The camera 303 captures an image 304 from surface 307. The pen 301 may further include additional sensors and/or processors as represented in broken box 306. These sensors and/or processors 306 may also include the ability to transmit information to another pen 301 and/or a personal computer (for example, via Bluetooth or other wireless protocols).

FIG. 3B represents an image as viewed by the camera 303. In one illustrative example, the resolution of an image captured by the camera 303 tis N×N pixels (where, in the illustrated example, N=32). Accordingly, FIG. 3B shows an example image 32 pixels long by 32 pixels wide. The size of N is adjustable, and a higher value of N will provide a higher image resolution. Also, while the image captured by the camera 303 is shown as a square for illustrative purposes here, the field of view of the camera may include other shapes as is known in the art. The images captured by camera 303 may be defined as a sequence of image frames $\{I_i\}$, where $I_i$ is captured by the pen 301 at sampling time $t_i$. The sampling rate may be large or small, depending on system configuration and performance requirement. The size of the captured image frame may be large or small, depending on system configuration and performance requirement.

FIG. 3A also shows the image plane 309 on which an image 310 of the pattern from location 304 is formed. Light received from the pattern on the object plane 307 is focused by lens 308. According to various embodiments of the invention, the lens 308 may be a single lens or a multi-part lens system, but is represented here as a single lens for simplicity. Image capturing sensor 311 captures the image 310.

The image sensor 311 may be large enough to capture the image 310. Alternatively, the image sensor 311 may be large enough to capture an image of the pen tip 303 at location 313. For reference, the image at location 313 will be referred to as the virtual pen tip. It should be noted that the virtual pen tip location with respect to image sensor 311 is fixed because of the constant relationship between the pen tip, the lens 308, and the image sensor 311.

Figure 3C:
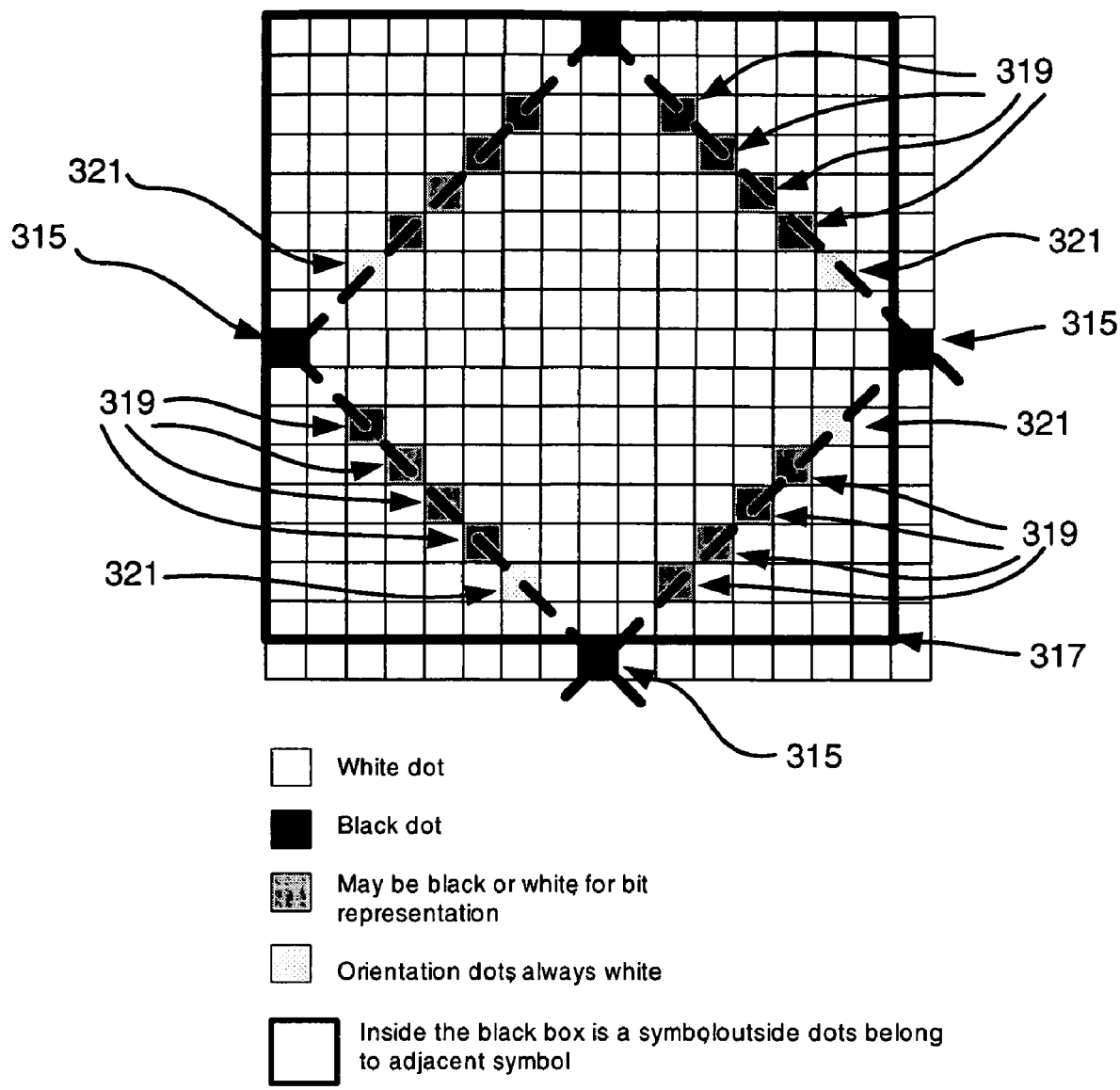
FIG. 3C then illustrates an example of a code symbol that can be employed to create an information pattern according to various examples of the invention.

FIG. 3C illustrates an example of a code symbol that can be used to represent one or more bits making up an information pattern. As seen in this figure, the code symbol has four black dark dots 315 that represent the border of the symbol 317. It also includes data dots 319 that can be either marked black or left white (or blank) to represent data bits. Still further, the illustrated code symbol includes orientation dots 321 that are always left white (or blank) to allow the decoding process to determine an orientation of the symbol.

As discussed herein, a code symbol is the smallest unit of visual representation of an information pattern. Generally, a code symbol will include the pattern data represented by the symbol. As shown in the illustrated example, one or more bits may be encoded in one code symbol. Thus, for a code symbol with 1 bit represented, the represented data may be "0" or "1", for a code symbol representing 2 bits, the represented data may be "00", "01", "10" or "11." Thus, a code symbol can represent any desired amount of data for the information pattern. The code symbol also will have a physical size. When the information pattern is, for example, printed on paper, the size of a code symbol can be measured by printed dots. For example, the illustrated code symbol is 16×16 printed dots. With a 600 dpi printer, the diameter of a printed dot will be about 0.04233 mm.

Still further, a code symbol will have a visual representation. For example, if a code symbol represents 2 bits, the visual representation refers to the number and position distribution of the black dots used to represent the data values "00", "01", "10" or "11". Thus, the code symbol illustrated in FIG. 3C may be referred to as a "8-a-16" symbol, since it represents 8 data bits using a 16×16 array of discrete areas. Of course, symbols having a variety of different represented pattern data values, sizes, and visual representation configurations will be apparent to those of ordinary skill in the art upon consideration of this description.

Brightness Normalization

Figure 4:
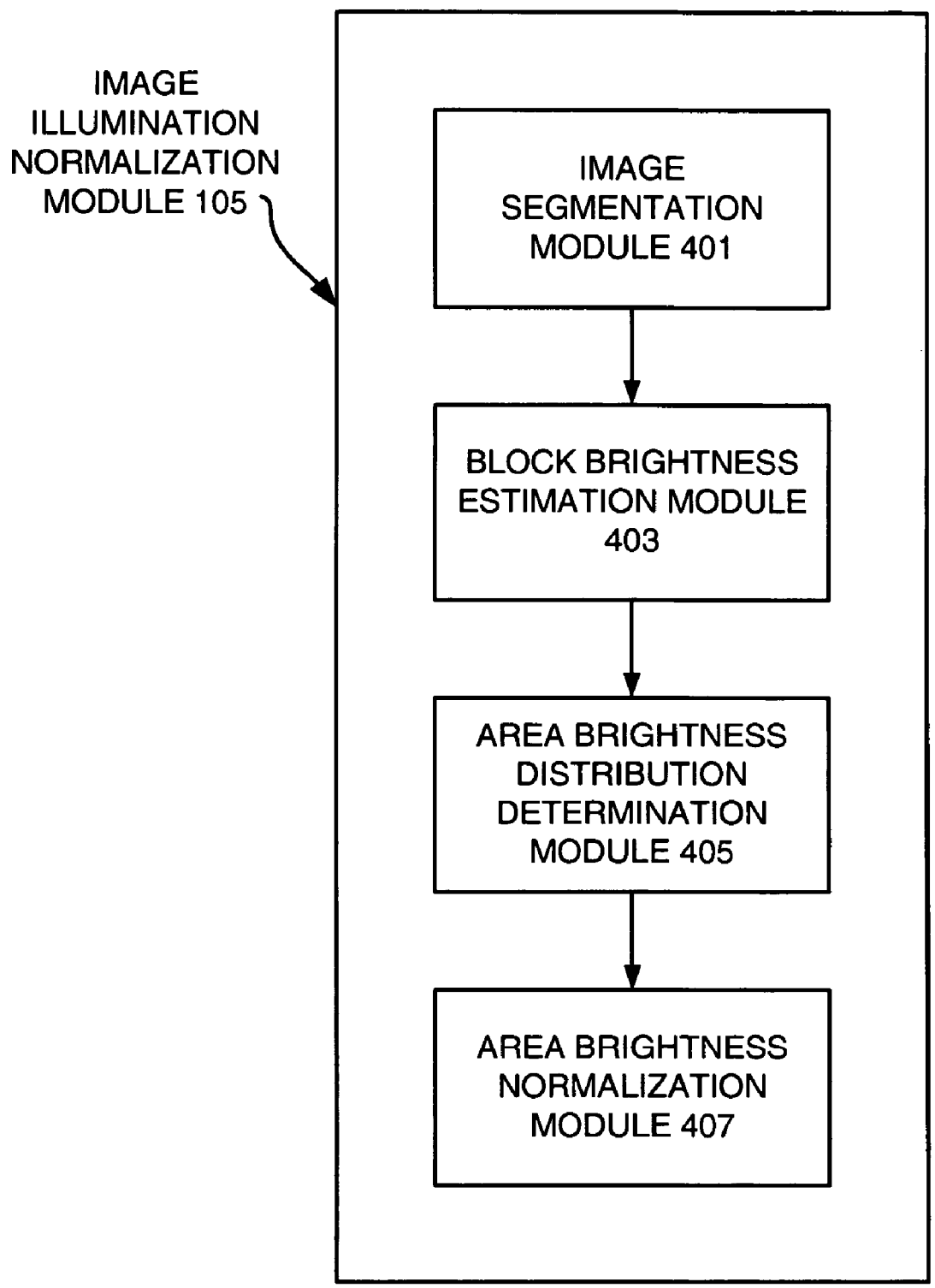
FIG. 4 illustrates an example of an image brightness normalization module that may be employed to normalize the brightness of an image according to various embodiments of the invention.

FIG. 4 illustrates one example of an image brightness normalization tool that may be employed for the image brightness normalization module 105 shown in FIG. 1. The image brightness normalization module 105 includes an image segmentation module 401 that segments an image into blocks of smaller areas, such as pixels, and a block brightness estimation module 403 that estimates the brightness of each block. The image brightness normalization module 105 also has an area brightness distribution determination module 405. This module performs a bilinear fitting of the brightness distribution for each area, as will be explained in more detail below. Still further, the image brightness normalization module 105 includes an area brightness normalization module 407, which normalizes the brightness of each area in the image. The operation of each of these modules will be discussed in greater detail with reference FIGS. 5A-14.

Figure 5A:
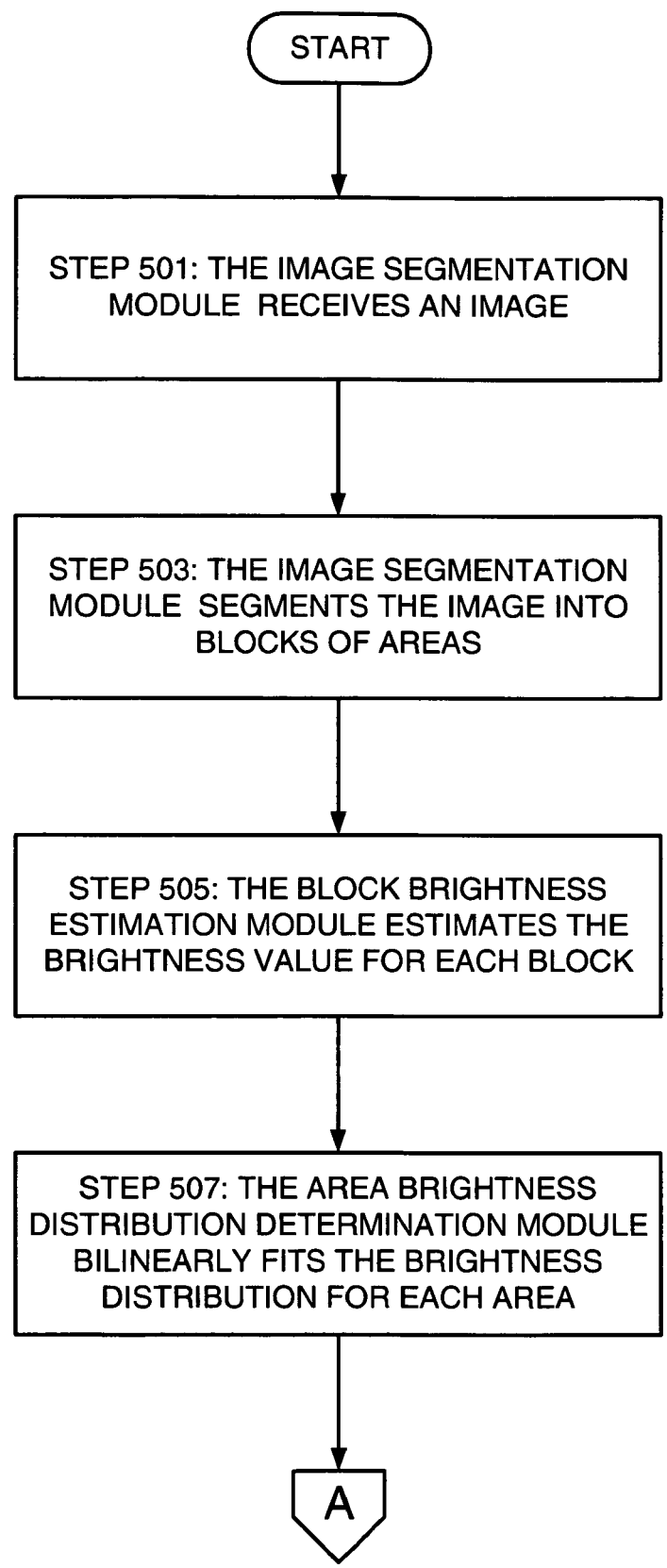
FIGS. 5A and 5B illustrate a flowchart describing the operation of the image brightness normalization module illustrated in FIG. 4.
Figure 5B:
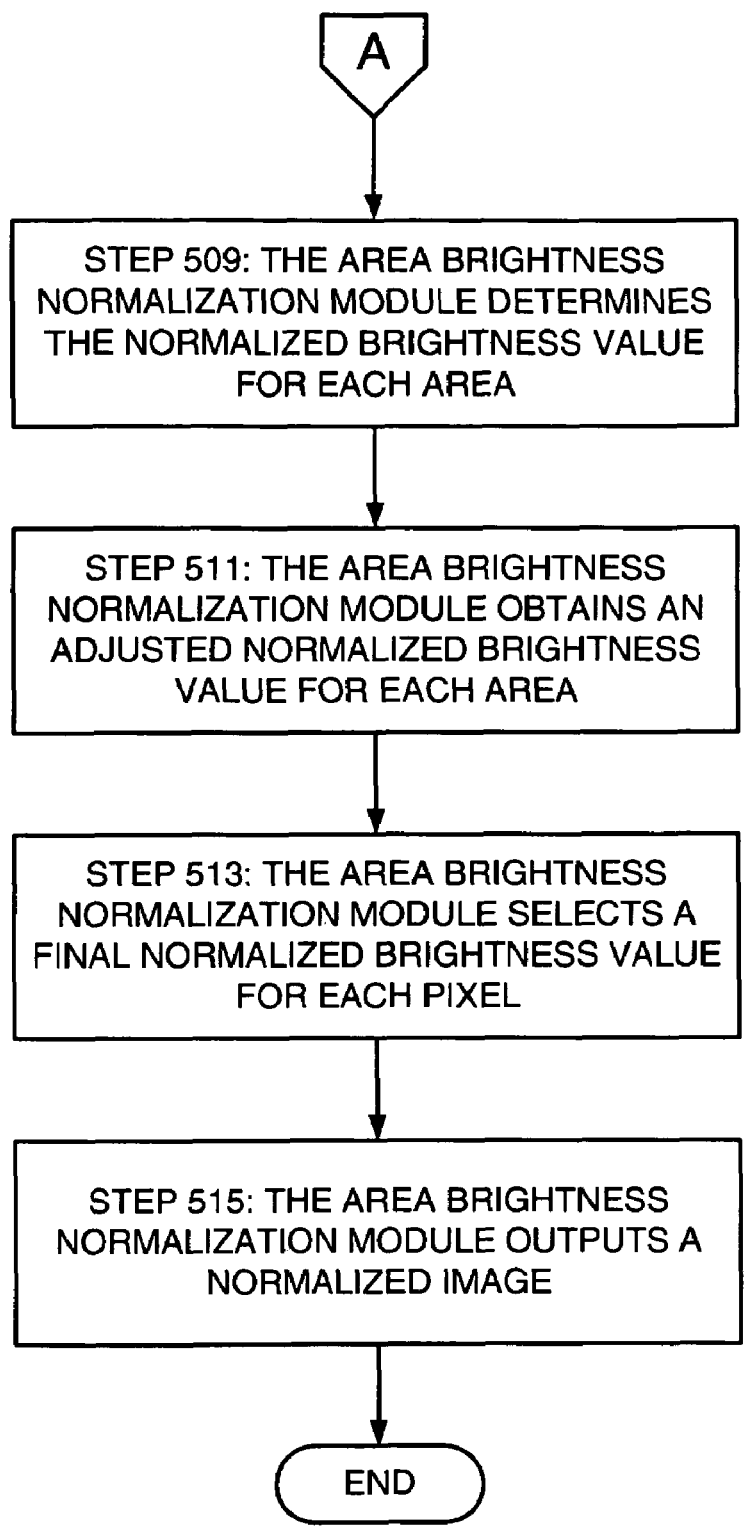
Figure 6:
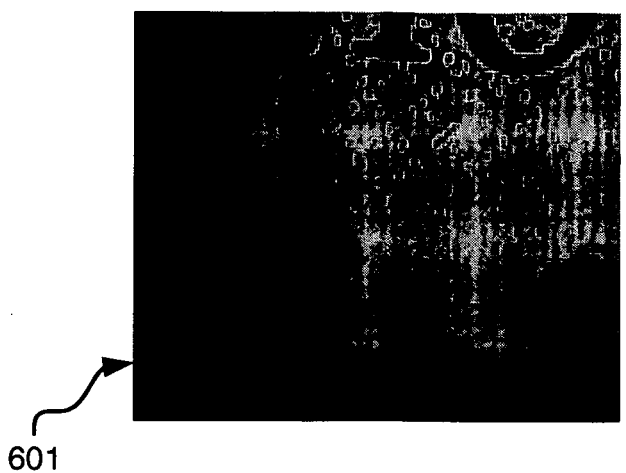
FIG. 6 illustrates an example of an image that might be processed by the image brightness normalization module illustrated in FIG. 4.

Turning now to FIG. 5A, in step 501 the image segmentation module 401 receives an image from the camera/pen device 101. FIG. 6 illustrates one example of a raw image 601 that might be received from the camera/pen device 101. As seen in this figure, the image 601 has regions that are relatively dark and regions that are relatively light, making it difficult to distinguish features in the image. In the illustrated embodiment, the image is 100×128 pixels (i.e., 100 pixels in the vertical direction and 128 pixels in the horizontal direction). It should be appreciated, however, that the image size will be determined by the camera employed by the camera/pen device 101, and various embodiments of the invention may be employed with images of any size.

Next, in step 503, the image segmentation module 401 segments the image 601 into blocks of areas. In the illustrated example, the image brightness normalization module 105 uses pixels as the areas upon which operations are performed. It should be appreciated, however, that alternately embodiments of the invention may use other units for the area. For example, with larger images, some embodiments of the invention may use groups of four adjacent pixels as the areas upon which operations are performed, while still other embodiments of the invention may use groups of six, eight, nine, sixteen, or any other number of pixels as the areas upon which operations are performed.

Figure 7:
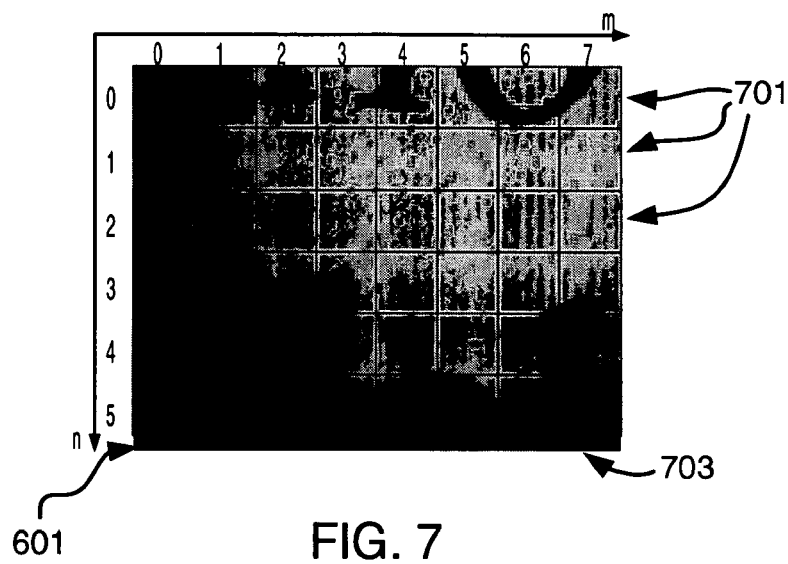
FIG. 7 illustrates the segmentation of the image into blocks starting from the top of the image.

More particularly, the image segmentation module 401 segments the image into blocks starting from the top of the image 601, as shown in FIG. 7. The blocks 701 may conveniently be identified hereafter by coordinate values on indices m, n, as shown in this figure. In the illustrated embodiment, image segmentation module 401 segments the image 601 into blocks 701 of 16 pixels by 16 pixels. It should be appreciated, however, that alternate embodiments of the invention may form the blocks from smaller or larger groups of pixels as desired.

Figure 8:
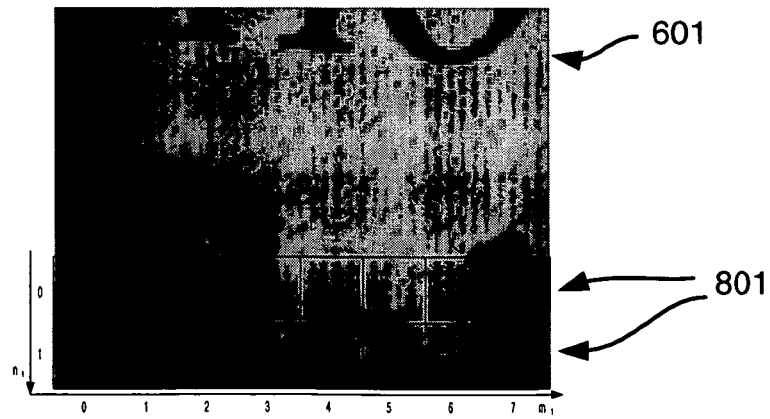
FIG. 8 illustrates the segmentation of the image into blocks starting from the bottom of the image.

Because the image 601 in the illustrated example has a height of 100 pixels and the blocks 701 are formed from 16×16 groups of pixels, there is a small region 703 at the bottom of the image 601 in which the pixels are not segmented into blocks 701. As will be apparent from the detailed explanation provided below, this discrepancy may skew the accuracy of the brightness normalization process. Accordingly, as shown in FIG. 8, the image segmentation module 401 forms a second segment of blocks 801 starting from the bottom of the image 601. The blocks 801 may conveniently be identified hereafter by coordinate values on indices $m_1$, $n_1$, as shown in FIG. 8. As with blocks 701, the blocks 801 are formed from 16×16 groups of pixels.

Next, in step 505, the block brightness estimation module 403 estimates the brightness value for each block 701 and 801. That is, the block brightness estimation module 403 estimates an overall representative brightness value for each block 701 and 801 based upon the gray level of each individual pixel making up the block. In the illustrated example, the block brightness estimation module 403 estimates the brightness value of a block 701 or 801 by creating a histogram of the number of pixels in the block at each gray-level.

Figure 9:
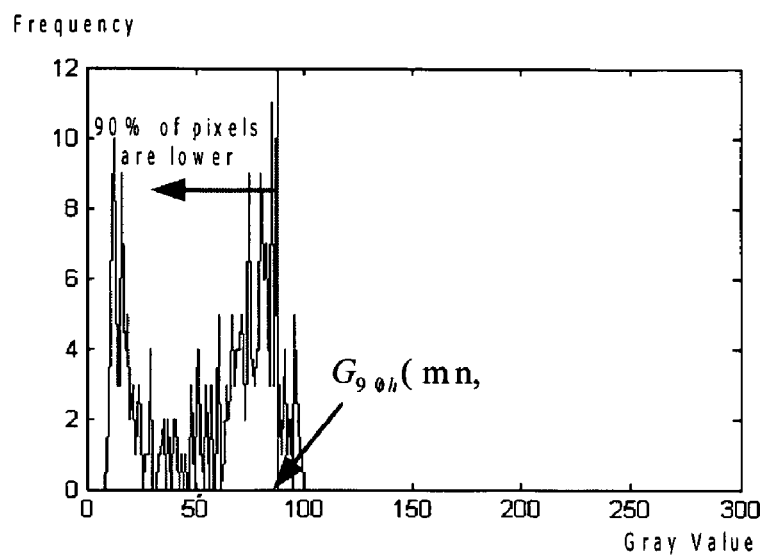
FIG. 9 illustrates one example of a type of histogram that might be employed by various embodiments of the invention to estimate the brightness of a block.

FIG. 9 illustrates one example of a type of histogram that might be employed by various embodiments of the invention to estimate the brightness of a block 701 or 801. As seen in this figure, the X-axis corresponds to the gray levels of the pixels making up the block. The Y-axis then corresponds to the number of pixels that have the gray level. Using this histogram, the block brightness estimation module 403 estimates a representative brightness value for the block. In the illustrated example, the block brightness estimation module 403 identifies the $90^{th}$ percentile gray level to be the estimated brightness value of the block. That is, the block brightness estimation module 403 identifies the gray level $G_{90th}$ at which 90% of the pixels in the block are darter than $G_{90th}$, and employs this value as the brightness value of the block. Of course, other embodiments of the invention may employ alternate percentile criteria for estimating the brightness value of a block as desired. Still further, some embodiments of the invention may employ alternate techniques for determining the overall brightness of each block.

It also should be noted that the illustrated example relates to a black-and-white image. Accordingly, the brightness level corresponds to a gray scale level Various embodiments of the invention alternately may be used to process color images. With these embodiments, the block brightness estimation module 403 will operate based upon the color brightness level of each pixel in the image.

After the block brightness estimation module 403 has estimated the brightness value for each block 701 and 801, the area brightness distribution determination module 405 performs a bilinear fitting of the brightness distribution for each area in step 507. As previously noted, there is a region 703 at the bottom of image 601 that has not been segmented into any of the blocks 701. The brightness distribution values for the pixels in these regions thus are determined using the blocks 801 rather than the blocks 701. Accordingly, the brightness distribution values are determined in a two-step process. The pixels that are primarily within blocks 701 (i.e., the pixels having a y coordinate value of 0-87 are determined using the estimated brightness values of the blocks 701, while the pixels that are primarily within blocks 801 (i.e., the pixels having a y coordinate value of 88-99) are determined using the estimated brightness values of the blocks 801.

With the illustrated embodiment, for each pixel (x, y), where y=0,1, . . . 87, the brightness distribution value of that pixel D(x, y) is estimated by using bilinear fitting method as:

$$D(x, y) = (1-\eta_y) \cdot [(1-\eta_x) \cdot I_{B(m,n)} + \eta_x \cdot I_{B(m+1,n)}] + \eta_y \cdot [(1-\eta_x) \cdot I_{B(m,n+1)} + \eta_x \cdot I_{B(m+1,n+1)}]$$

where $I_{B(m,n)} = G_{90th}$ (m, n) s is the size of a block (in the illustrated example, $$s = 16),$$

$$m = \min\left(\max\left[int\left(\frac{x - s/2}{s}\right), 0\right], 6\right),$$

$$n = \min\left(\max\left[int\left(\frac{y - s/2}{s}\right), 0\right], 4\right),$$

$$x_1 = ms + \frac{s}{2},$$

$$x_2 = (m+1)s + \frac{s}{2},$$

$$y_1 = ns + \frac{s}{2},$$

$$y_2 = (n+1)s + \frac{s}{2},$$

$$\eta_x = \frac{x - x_1}{x_2 - x_1},$$

and $$\eta_y = \frac{y - y_1}{y_2 - y_1}.$$

It should be noted that int(x) is a function that returns the largest integer less than or equal to x. For example, int(1.8)=1, int(−1.8)=−2.

Figure 10:
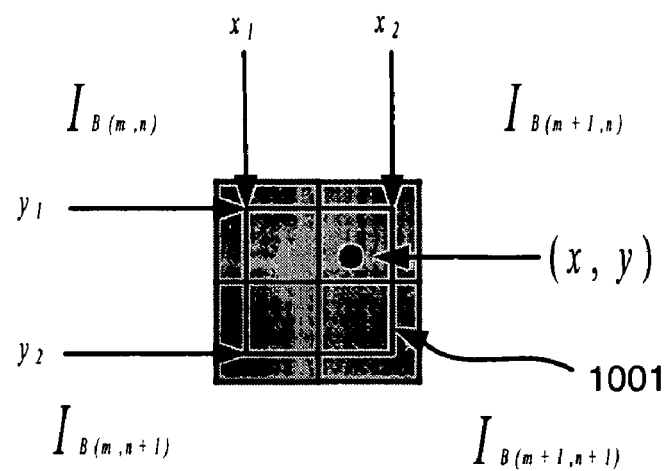
FIG. 10 illustrates the gray level information obtained using the operation described in FIGS. 5A and 5B.
Figure 11:
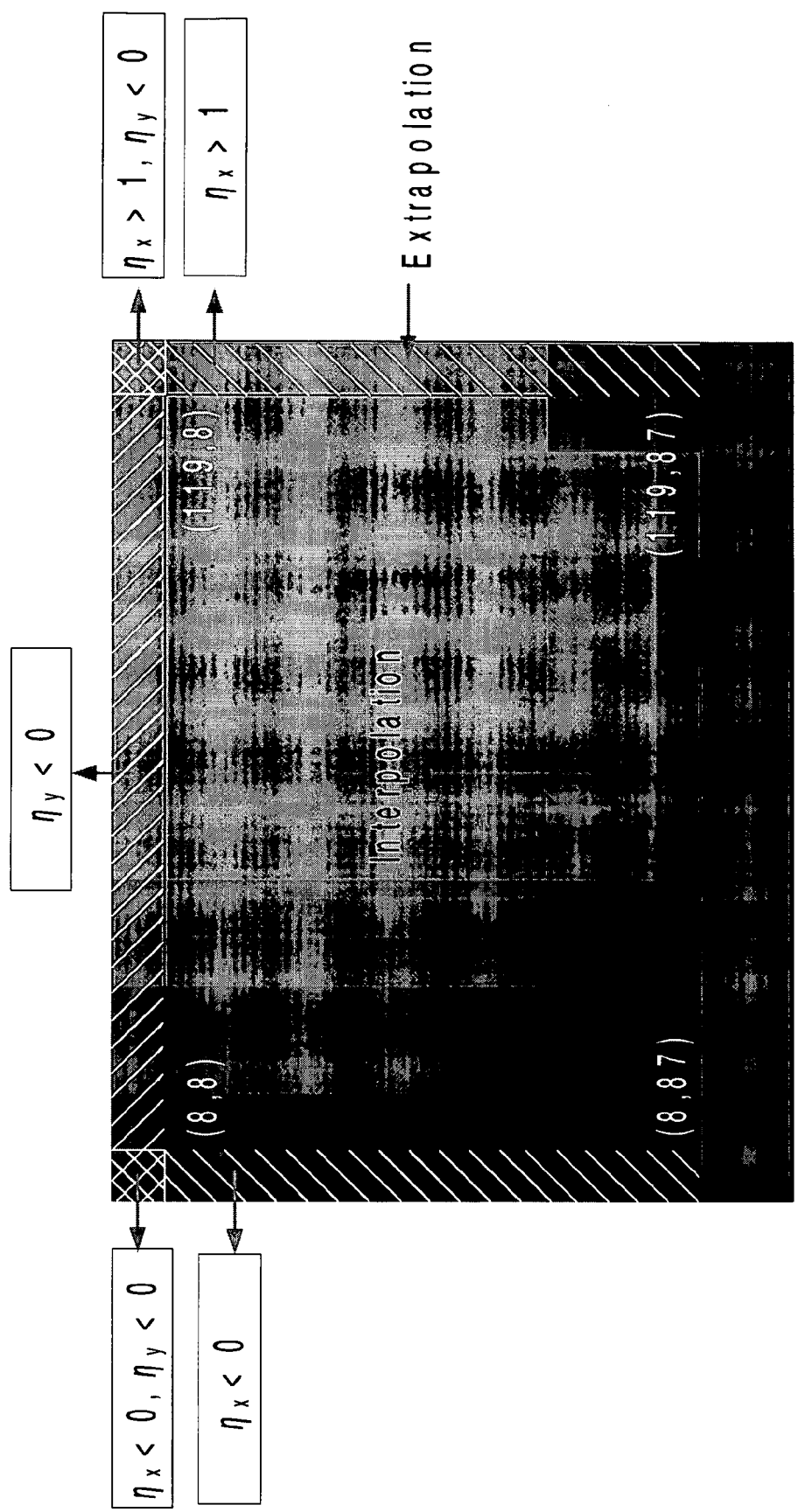
FIGS. 11 and 12 illustrate the different regions for which interpolation is used to determine the brightness value information according to various embodiments of the invention.
Figure 12:
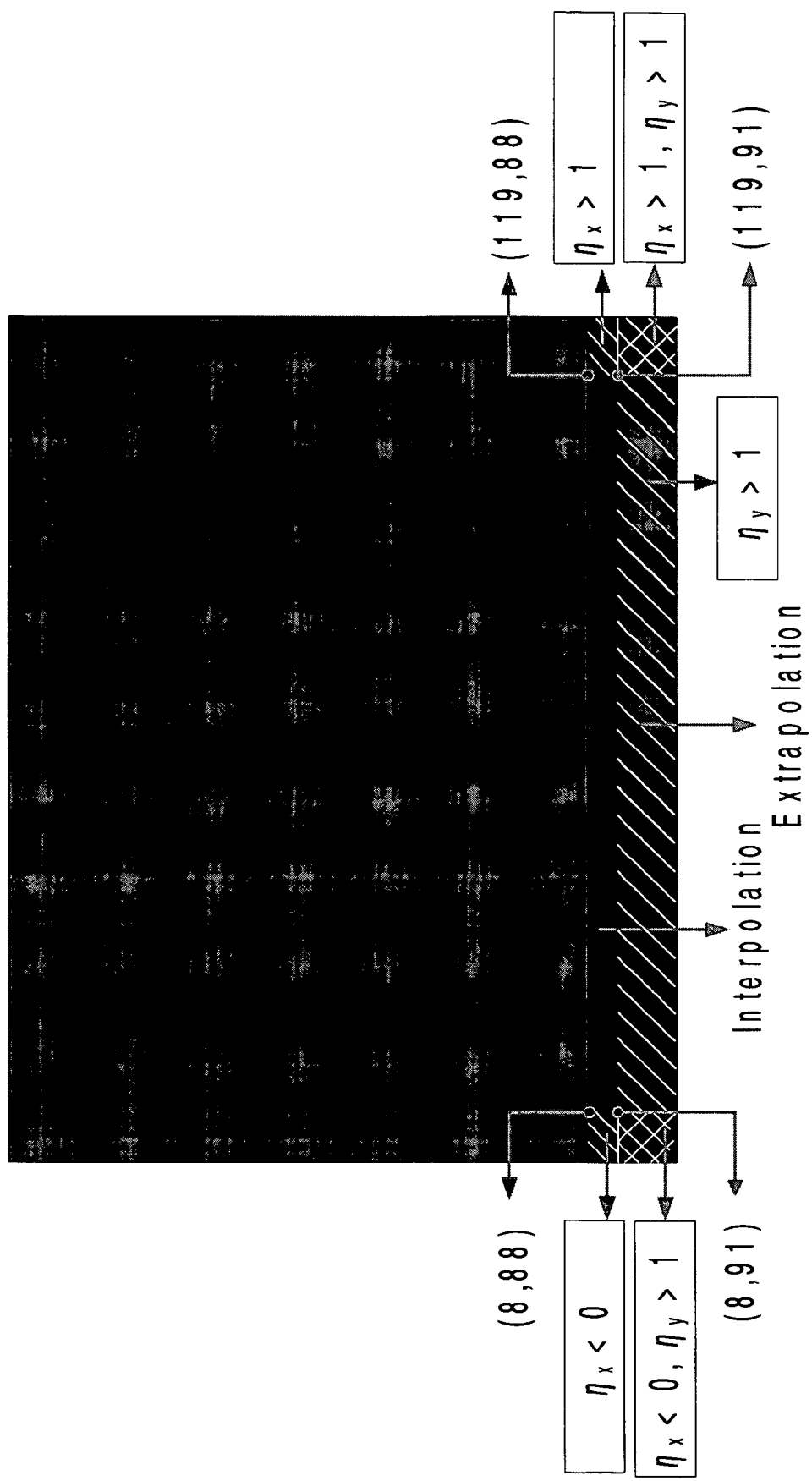
Figure 13:
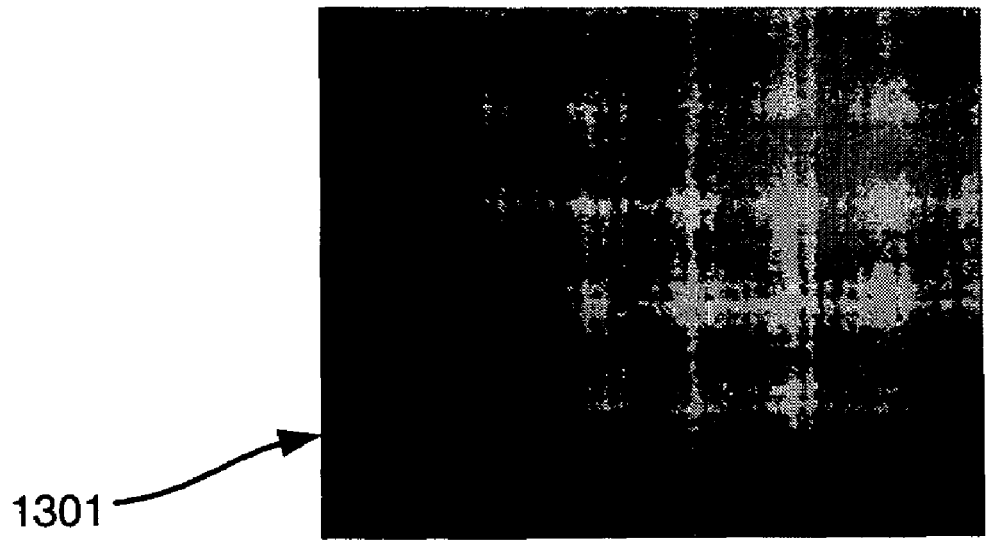
FIG. 13 illustrates the brightness distribution values obtained for the image shown in FIG. 6 using the operation described in FIGS. 5A and 5B.

The brightness value information employed to determine the brightness distribution value of a pixel using this process is graphically illustrated in FIG. 10. As will be appreciated from this image, some pixels will fall outside of any region 1001 that can be equally distributed among four adjacent blocks 701. For example, in the illustrated example, pixels having an x coordinate value of 0-7 or 120-127 and pixels having a y coordinate value of 0-7 will fall outside of any region 1001 that can be equally distributed among four adjacent blocks 701. For these pixels in border regions, the above equations may still be applied to determine their brightness distribution values, except that extrapolation will be used instead of interpolation. The different regions are graphically illustrated in FIG. 11.

Similarly, for each pixel (x, y), where y=88,89, . . . 99, the brightness distribution value of that pixel D(x, y) is estimated as:

$$D(x, y) = (1-\eta_y) \cdot [(1-\eta_x) \cdot I_{B(m_1,n_1)} + \eta_x \cdot I_{B(m_1+1,n_1)}] + \eta_y \cdot [(1-\eta_x) \cdot I_{B(m_1,n_1+1)} + \eta_x \cdot I_{B(m_1+1,n_1+1)}]$$

where $I_{B(m_1,n_1)} = G_{90th}$ ($m_1$, $n_1$) s is the size of a block (in our implementation, s=16), $$m_1 = \min\left(\max\left[int\left(\frac{x - s/2}{s}\right), 0\right], 6\right),$$

$$n_1 = 0,$$

$$x_1 = m_1 s + \frac{s}{2},$$

$$x_2 = (m_1 + 1)s + \frac{s}{2},$$

$$y_1 = height - s - \frac{s}{2} - 1,$$

$$y_2 = height - \frac{s}{2} - 1,$$

$$\eta_x = \frac{x - x_1}{x_2 - x_1},$$

and $$\eta_y = \frac{y - y_1}{y_2 - y_1}.$$

height is the height of the image sensor. In the illustrated example, height=100.

Again, some pixels will fall along the image border outside of any region that can be equally distributed among four adjacent blocks 801. For these pixels in border regions, the above equations may still be applied to determine their brightness distribution values, except that extrapolation will be used instead of interpolation. The different regions are graphically illustrated in FIG. 12. The brightness distribution values 1301 for the entire image 601 are then shown in FIG. 13.

Once the area brightness distribution determination module 405 has determined the brightness distribution value for each area, the area brightness normalization module 407 determines the normalized gray level value for each area in step 509. More particularly, the area brightness normalization module 407 determines the normalized gray level value for each area by dividing the area's original gray level value for the brightness distribution value for that area. Next, in step 511, the area brightness normalization module 407 obtains an adjusted normalized gray level value for each area by multiplying the normalized gray level value for each area by a uniform brightness level $G_0$. In the illustrated example, the value of uniform brightness level $G_0$ is 200, but alternate embodiments of the invention may employ different values for the uniform brightness level $G_0$. The uniform brightness level $G_0$ represents the supposed gray level of the captured image in a blank area for an ideal situation (i.e., a uniform illumination with an ideal image sensor). Thus, in an ideal case, the gray level of all pixels of a captured image from a blank area should be equal to the uniform brightness level $G_0$.

Figure 14:
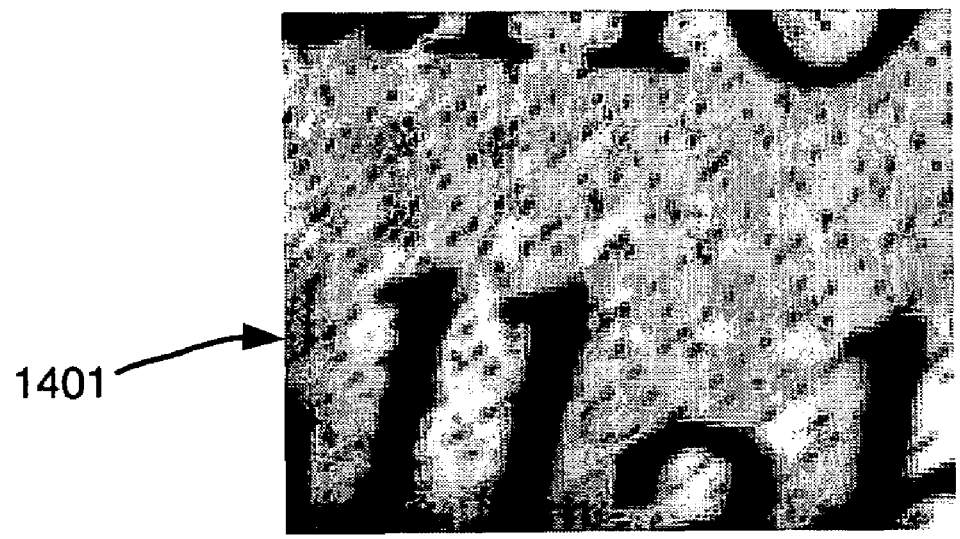
FIG. 14 illustrates how the image shown in FIG. 6 appears after being processed using the operation described in FIGS. 5A and 5B.

Lastly in step 513, the area brightness normalization module 407 selects a final normalized gray level value for each pixel by assigning each pixel a new gray level value that is the lesser of its adjusted normalized gray level value and the maximum gray level value. Thus, with the illustrated example, the final normalized gray level value for each pixel is determined as a gray level G(x, y) where:

$$G(x, y) = \min\left(G_0 \cdot \frac{G(x, y)}{D(x, y)}, 255\right)$$

where $G_0$=200 and 255 is the maximum gray level (i.e., white). Then, in step 515, area brightness normalization module 407 outputs a normalized image using the final normalized gray level value for each pixel. FIG. 14 illustrates how the image 601 appears as image 1401 after being processed in the manner described in detail above.

Pattern Determination

Figure 15:
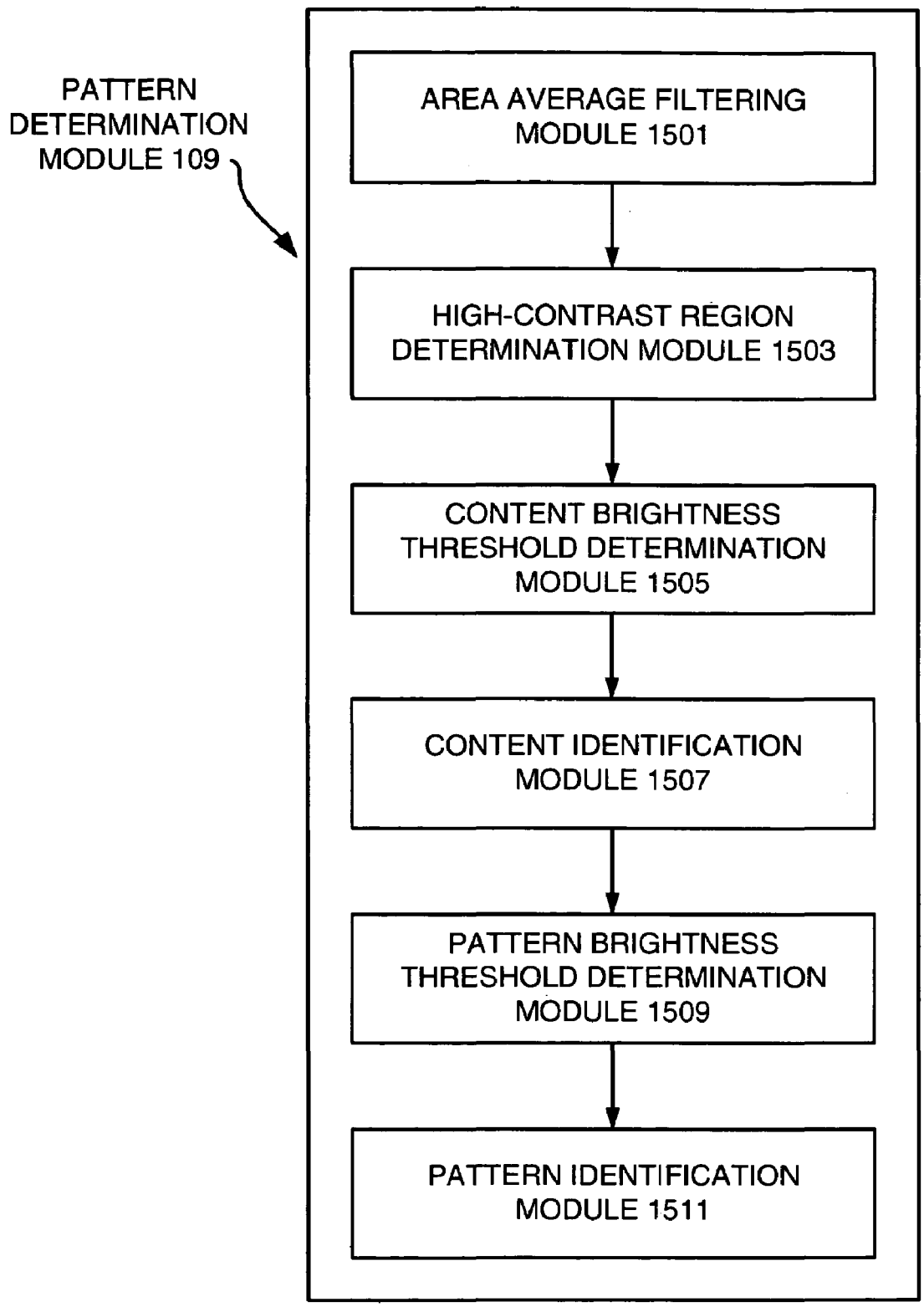
FIG. 15 illustrates a pattern determination system for distinguishing an information pattern from content in a document image according to various embodiments of the invention.
Figure 16A:
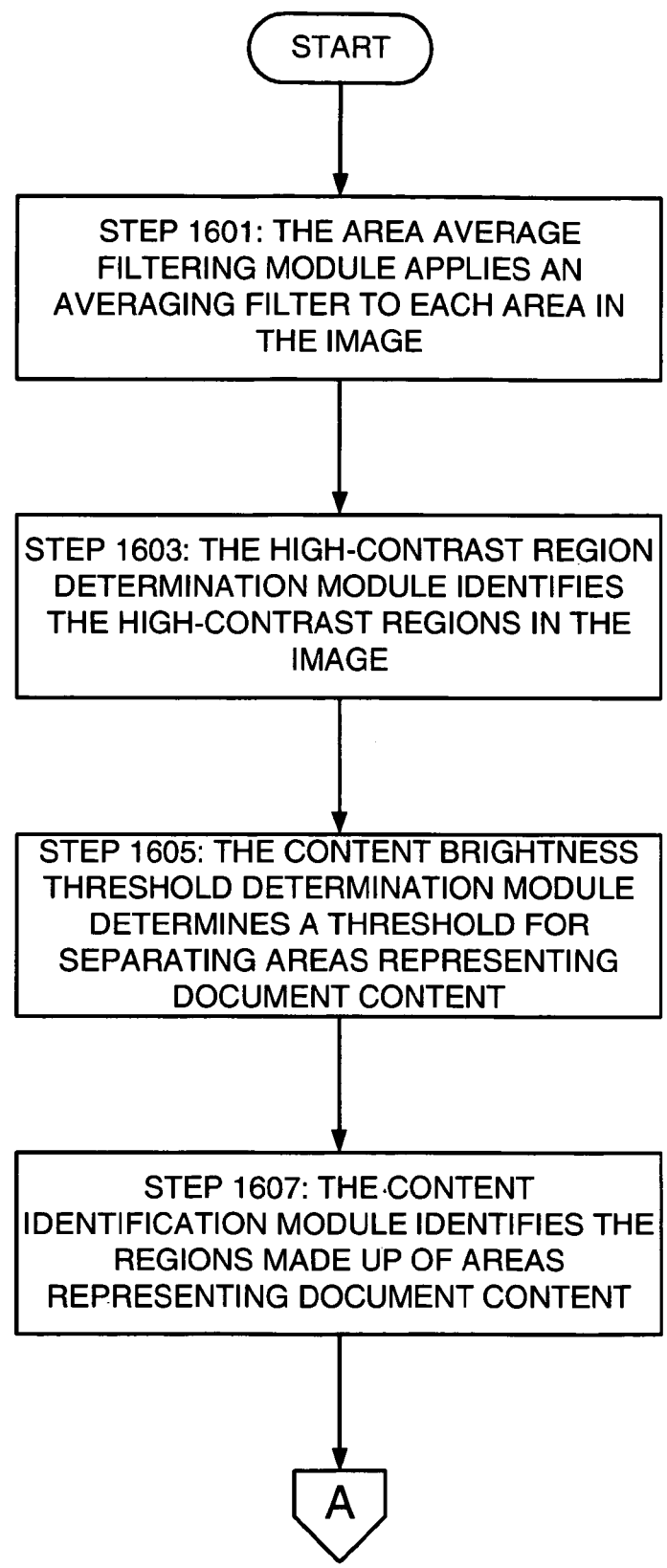
FIGS. 16A and 16B illustrate a flowchart describing the operation of the pattern determination system illustrated in FIG. 15.
Figure 16B:
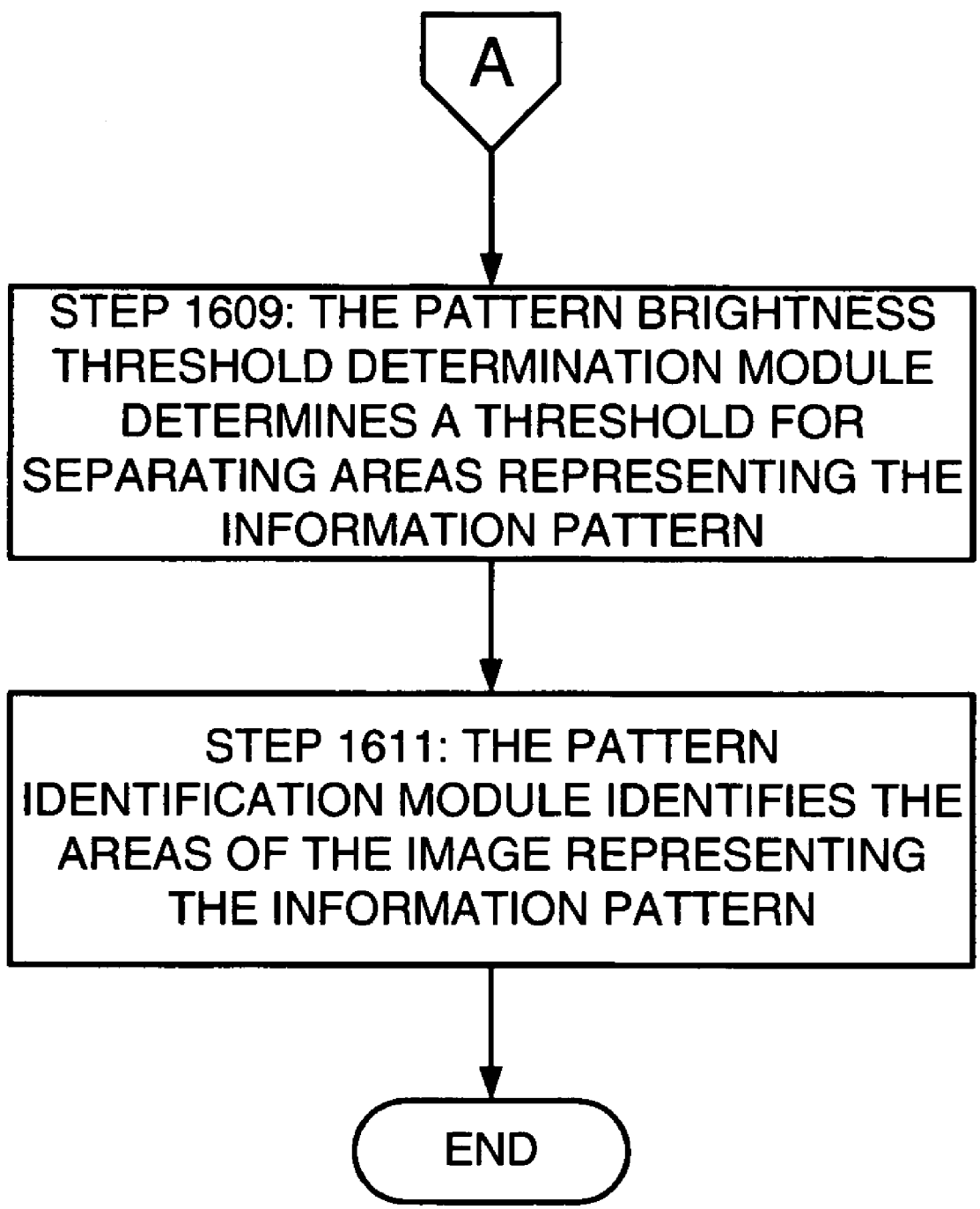

After the image brightness normalization module 105 normalizes the image captured by the pen/camera device 101, the pattern determination module 109 distinguishes the areas of the normalized image that represent content in a document from the areas of the normalized image that represent the information pattern. FIG. 15 illustrates a pattern determination system for distinguishing an information pattern from content in a document image. As seen in this figure, the pattern determination module 109 includes an area average filtering module 1501 and a high-contrast region determination module 1503. As will be discussed in greater detail below, the area average filtering module 1501 applies an averaging filter to the brightness value of each area in the image. The high-contrast region determination module 1503 then identifies high-contrast regions in the image.

The pattern determination module 109 also includes a content brightness threshold determination module 1505, a content identification module 1507, a pattern brightness threshold determination module 1509, and a pattern identification module 1511. As will be discussed in greater detail below, for a black-and-white image, the content brightness threshold determination module 1505 determines a first gray level value threshold that the content identification module 1507 then uses to identify areas of the image representing content. Similarly, for a black-and-white image, the pattern brightness threshold determination module 1509 determines a second gray level value threshold that the pattern identification module 1511 uses to identify areas of the image that represent an information pattern.

The pattern determination module 109 takes advantage of the fact that, in an image of a document containing both content (e.g., printed text, pictures, etc.) and an information pattern, the information pattern, document content and document background tend to have different brightness levels. Thus, with a black-and-white image, the areas representing the information pattern, document content and document background will typically have different gray levels, with the areas representing the document content being the darkest, the areas representing the information pattern being the second darkest, and the areas representing the document background being the least dark. Thus, the pattern determination module 109 can distinguish the three different areas by thresholding.

In order to more efficiently determine the appropriate thresholds to separate the three brightness levels, the pattern determination module 109 first identifies high-contrast regions. For black-and-white images, these are regions that have a relatively large difference in gray levels between adjacent image areas (e.g., such as pixels). Thus, the threshold for segmenting the areas representing document content from other areas in the image can be more effectively identified in the high-contrast areas. Once the threshold is found, regions that are darker than the threshold are identified as representing document content. These regions can then be marked as being made up of areas representing content. For example, the areas in a content region may be assigned a value of 1 in a document content mask.

After the regions representing document content have been identified, the brightness values of the remaining areas can then be analyzed. Those regions having an gray level value above a second threshold are then identified as representing the information pattern. These regions can then be marked as being made up of areas representing the information pattern. For example, the areas in a pattern region may be assigned a value of 1 in an information pattern mask. Thus distinguished from the rest of the image, the areas representing the information pattern can be more accurately analyzed by the pattern analysis module 111.

The operation of the pattern determination module 109 will now be described with reference to FIGS. 16A-20. More particularly, the operation of the pattern determination module 109 will be discussed as applied to the normalized image 1401. Thus, in this example, the image is a black-and-white image. It should be appreciated, however, that various embodiments of the invention may be employed to process color images. As previously noted with respect to the image brightness normalization module 105, if the image is a color image, then the pattern determination module 105 will operate using color brightness levels rather than gray levels. Also, the illustrated example of the pattern determination module 109 uses pixels as the area unit on which it performs operations. It should be noted, however, that other examples of the invention may operate on other areas, such as groups of multiple pixels, as previously described with respect to the image brightness normalization module 105.

Initially, high contrast areas are identified to more efficiently locate regions that represent content, as previously noted. Because the regions representing the information pattern may also have a large difference in brightness levels, however, the image areas are first filtered to reduce the brightness level value difference in the regions surrounding the information pattern. More particularly, in step 1601, the area average filtering module 1501 applies an averaging filter to each area in the image. For black-and-white images, this filtering operation replaces the gray level of each pixel by an average of the gray levels of the surrounding eight pixels and the gray level of the pixel itself. That is, for every pixel (x, y)

$$G_{average}(x, y) = \frac{1}{9} \sum_{i=-1}^{1} \sum_{j=-1}^{1} G(x+i, y+j)$$

where G(x, y) is the gray level of pixel (x, y). It should be note that G(x, y) is the brightness-normalized gray level.

Figure 17:
FIG. 17 illustrates the high-contrast areas identified using the operation described in FIGS. 16A and 16B.

Next, in step 1603, the high-contrast region determination module 1503 identifies the high-contrast regions in the image using the averaged gray level of each pixel. In particular, for each pixel, the high-contrast region determination module 1503 identifies the maximum and the minimum averaged gray level values in the 17×17 pixel neighborhood surrounding the pixel. That is, for every pixel (x, y), $G_{max}(x, y) = \max(G_{average}(p, q) | \max(x-8, 0) \leq p \leq \min(x+8, 127), \max(y-8, 0) \leq q \leq \min(y+8, 127))$ $G_{min}(x, y) = \min(G_{average}(p, q) | \max(x-8, 0) \leq p \leq \min(x+8, 127), \max(y-8, 0) \leq q \leq \min(y+8, 127))$ It should be appreciated that the determination described above is based upon the specific number of pixels of the image used in the illustrated example. A similar determination, using different pixels coordinate values, would be employed for embodiments of the invention used to process images of different sizes. Next, the high-contrast region determination module 1503 defines a high-contrast region as High Contrast Region=$\{(x, y) | [G_{max}(x, y) - G_{min}(x, y)] > D_0\}$ where $D_0$ is a predetermined threshold. The value of $D_0$ is determined empirically. In the illustrated example, $D_0$=140, but it should be appreciated, however, that other embodiments of the invention may employ different threshold values depending, e.g., upon the contrast quality provided by the camera/pen device 101. FIG. 17 illustrates the high-contrast areas 1701 identified in image 1401 using the above-described technique.

Figure 18:
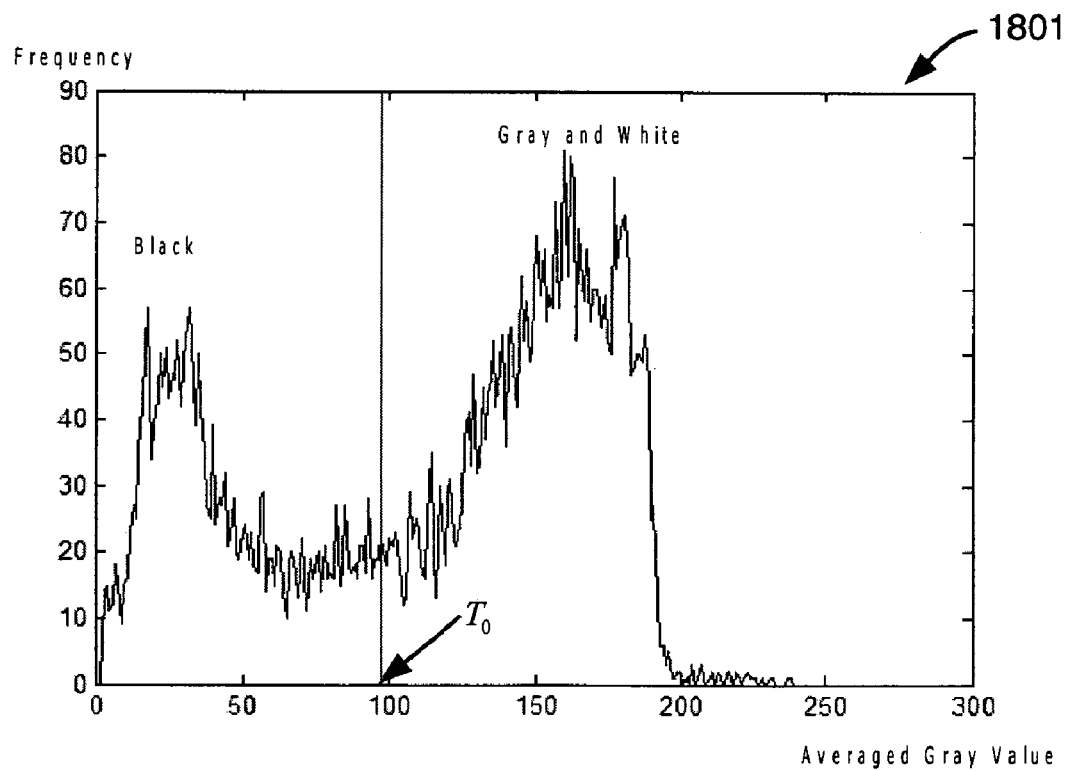
FIG. 18 illustrate an example of a gray-level histogram used to determine a content brightness threshold according to various examples of the invention.

Next, in step 1605, the content brightness threshold determination module 1505 determines a threshold for separating areas representing document content from the other areas of the image. To determine the threshold, the content brightness threshold determination module 1505 creates a gray-level histogram for the high-contrast regions. An example of such a histogram 1801 is illustrated in FIG. 18. As seen in this figure, the X-axis of this histogram 1801 corresponds to the averaged gray levels of the pixels in the high-contrast regions. The Y-axis then corresponds to the number of pixels at that gray level. From the histogram, a threshold $T_0$ for separating the darker pixels from gray and white pixels can be identified. Any suitable technique for selecting a threshold to distinguish darker pixels from gray and white pixels may be employed. One such technique for obtaining the threshold $T_0$ is described, for example, in N. Otsu, "A Threshold Selection Method from Gray-Level Histogram," *IEEE Transactions on Systems, Man, and Cybernetics*, 9(1), (1979), pp.62-66, which is incorporated entirely herein by reference.

Once the threshold value $T_0$ has been determined, the content identification module 1507 uses the threshold $T_0$ to identify the areas of the image representing content in step 1607. First, given $T_0$, pixels in the image that are darker than $T_0$ are identified as images representing the document content and are assigned a value of 1 in a document content mask. Thus, for every pixel (x, y), if $$G_{average}(x, y) \leq T_0,$$

then Document Content Mask (x, y)=1, else Document Content Mask (x, y)=0.

After the document content mask has been created, those regions $R_t$, are identified, where t=1, 2, ... T, of pixels $(x_i, y_i)$ as follows:

$$R_t = \{(x_i, y_i) | \text{Document Content Mask } (x_i, y_i)=1, (x_i, y_i) \text{ are neighbors}\}.$$

Figure 19:
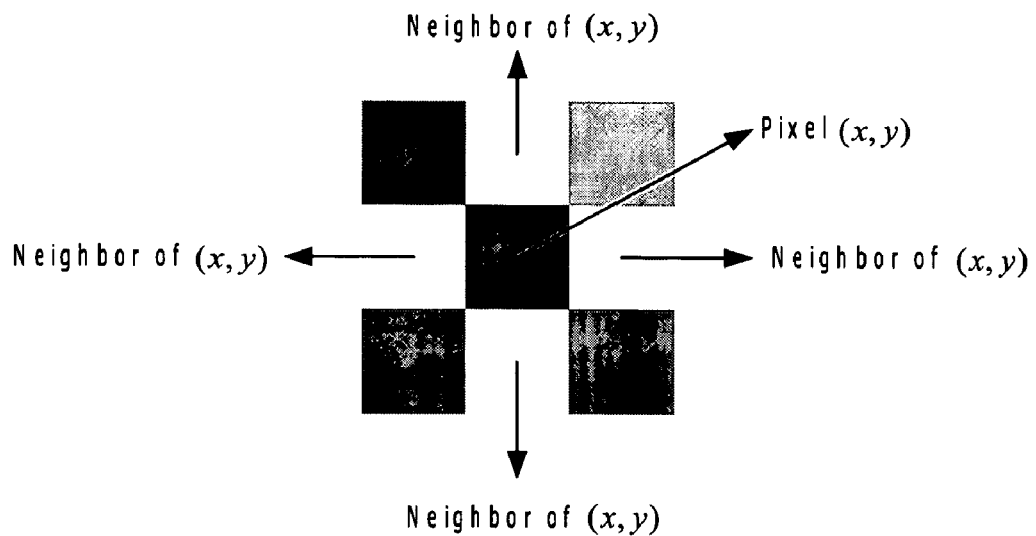
FIG. 19 illustrates a relationship between neighboring pixels.
Figure 20:
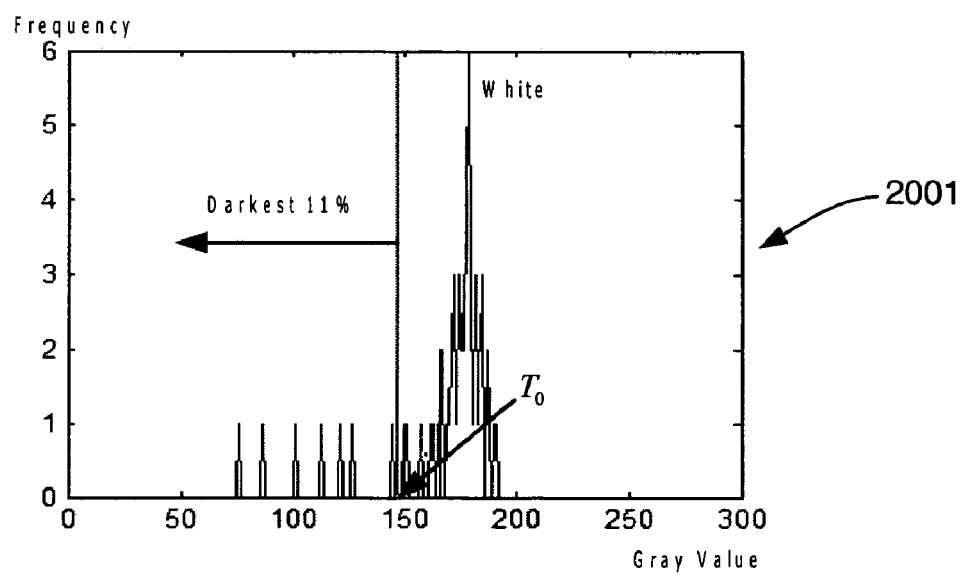
FIG. 20 illustrates an image that has been processed using the operation described in FIGS. 5A, 5B, 16A and 16B.

Two pixels are neighbors if they are directly below, above or next to each other, as shown in FIG. 19. Thus, the mask identifies regions $R_t$ of neighboring areas that represent content. In the illustrated example, if a region $R_t$ contains fewer than 20 pixels, it is removed from the document content mask. That is, for each pixel $(x_i, y_i) \in R_t$, Document Content Mask $(x_i, y_i)=0$. This eliminates regions that are too small to actually represent document content.

Next, in step 1609, the pattern brightness threshold determination module 1509 determines a second threshold for separating the areas representing the information pattern from the remaining areas of the image (i.e., the non-content areas). Initially, the pattern brightness threshold determination module 1509 segments the image into 8×8 pixel blocks. For black-and-white images, the pattern brightness threshold determination module 1509 then creates a gray-level value histogram for each 8×8 pixel block, such as the histogram 2001 in FIG. 20. As seen in this figure, the X-axis corresponds to the brightness-normalized gray levels of non-document content pixels in the block, i.e. pixels for which Document Content Mask (x, y)=0. The Y-axis then corresponds to the number of non-document content pixels at that gray level.

From the histogram, a second threshold $T_0$ is identified to distinguish information pattern areas from the remaining background areas. The second threshold $T_0$ is empirically chosen, based on the size of the camera sensor in the pen/camera device 101 and the size of code symbol, to be approximately equal to the ratio of black dots in the code symbol. In the illustrated example, the code symbol is the 8-a-16 code symbol illustrated in FIG. 3C. Thus, the second threshold $T_0$ is selected such that 11% of the pixels are darker than $T_0$.

Once the second threshold $T_0$ is determined, the pattern identification module 1511 identifies the areas of the image representing the information pattern in step 1611. More particularly, for every pixel (x, y) in a block, if Document Content Mask (x, y)=0 and $G(x, y) \leq T_0$, then the pattern identification module 1511 assigns Pattern Mask (x, y)=1, else, Pattern Mask (x, y)=0.

For the bottom pixels (i.e., the 4×128 pixel region along the bottom border of the image), the 4×128 pixel area directly above may be used to form 8×8 pixel blocks. Within each of these bottom blocks, the second threshold is determined using the same method described in detail above. Only those pixels in the bottom region are compared against the threshold, however, as the pixels "borrowed" from the region directly above will already have been analyzed using the second threshold established for their original blocks. Those bottom pixels that are darker than the threshold are identified as representing the information pattern.

After all of the pixels having a gray level below their respective second threshold values have been identified, those identified pixels that are adjacent to pixels representing document content are removed from the information pattern mask. That is, for every pixel (x, y), if Pattern Mask (x, y)=1 and a pixel among 8 neighbors of (x, y) has been identified as representing document content (i.e., there exists i, j, where i=−1, 0, 1, j=−1, 0, 1, such that Document Content Mask (x+i, y+j)=1), then Pattern Mask (x, y)=0. In this manner, the pixels making up the information pattern can be accurately distinguished from the other pixels in the image. Further, the image preprocessing system 103 according to various examples of the invention can output a new image that clearly distinguishes an information pattern from the remainder of the image.

CONCLUSION

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A method of normalizing brightness in an image, comprising:
    receiving an image made up of areas, each area having an original brightness value;
    dividing the image up into blocks of areas;
    determining an estimated brightness of each block;
    determining a brightness distribution value for each area by fitting the estimated brightness determined for each block surrounding the area using bilinear interpolation and extrapolation;
    normalizing a brightness value for each area by dividing an original brightness value for the area by the brightness distribution value determined for the area to produce a normalized brightness value; and
    creating a new image using the normalized brightness value for each area.

2. The method recited in claim 1, wherein an area is a pixel.

3. The method recited in claim 1, further comprising
    multiplying the normalized brightness value for each area by a uniform brightness level to produce an adjusted normalized brightness value for each area; and
    creating the new image using the adjusted normalized brightness value for each area.

4. The method recited in claim 1, further comprising determining the estimated brightness of each block to be the 90th percentile of brightness values of the areas making up the block.

5. The method recited in claim 1, wherein the image is a black-and-white image; and the brightness values are gray level values.

6. The method recited in claim 1, wherein the image is a color image, and the brightness level values are color brightness values.

* * * * *